United States Patent [19]

Häfner

[11] Patent Number: 4,480,707
[45] Date of Patent: Nov. 6, 1984

[54] WEIGHING APPLIANCE, PARTICULARLY FOR MEASURING A GREAT WEIGHT WITH HIGH PRECISION

[75] Inventor: Hans W. Häfner, Aichach, Fed. Rep. of Germany

[73] Assignee: Pfister GmbH, Fed. Rep. of Germany

[21] Appl. No.: 438,902

[22] Filed: Nov. 2, 1982

[30] Foreign Application Priority Data

Nov. 20, 1981 [DE] Fed. Rep. of Germany ...... 3146021

[51] Int. Cl.³ .................. G01G 5/00; G01G 5/04; G01G 21/00
[52] U.S. Cl. .................. 177/208; 177/DIG. 9; 73/862.38
[58] Field of Search .............. 177/208, DIG. 9; 73/862.38, 862.58, 862.61

[56] References Cited

U.S. PATENT DOCUMENTS 3,773,123 11/1973 Lopez .................. 177/136 X
3,993,149 11/1976 Harvey .................. 177/163

FOREIGN PATENT DOCUMENTS 2758340 5/1979 Fed. Rep. of Germany.

Primary Examiner—George H. Miller, Jr.
Assistant Examiner—Patrick W. Foster
Attorney, Agent, or Firm—Hill, Van Santen, Steadman & Simpson

[57] ABSTRACT

A weighing apparatus for measuring large loads such as heavy weights including a weighing cell against which the load is applied having an upper stationary member and a lower stationary base member with a rotatable nut therebetween and the stationary member parts separated from the nut by a plurality of antifriction bearings in the form of a hydrostatic parting liquid chambers supplied by a pressure pump, helical work surfaces between the nut and base member, a spindle extending between the nut and stationary members wth hydrostatic liquid pockets also pressurized and a torque arm connected to the nut with a force measuring member connected to the torque arm.

14 Claims, 9 Drawing Figures

4,480,707

WEIGHING APPLIANCE, PARTICULARLY FOR MEASURING A GREAT WEIGHT WITH HIGH PRECISION

BACKGROUND OF THE INVENTION

The present invention relates to a structure for measuring a large weight with high precision, and more particularly to a device for measuring a large vertical force such as a great weight using a load pick-up having a force transducer and a weighing cell.

In accordance with the invention, a force transducer is used wherein a force such as delivered by a large weight is resolved into components and is mechanically or hydraulically transmitted and converted into analog electrical voltage units or digital pulses and is thereby converted, edited and made detectable in a suitable manner for a measurement of the force or weight.

Structures heretofore have utilized a force resolution wedge as a force transducer with a fluid work agent supplied under pressure and an interactive connection to a pair of support elements having gliding surfaces disposed in series with a final control element as a load chain whereby the load chain is equipped with a force measuring means as shown in German OS No. 27 58 430.

The advantage of such arrangement equipped with a force resolution wedge, a final control element and a force measuring means resides in that the arrangement achieves the following:

is uncomplicated in structure and function;
is employable up to extremely high loads;
is practically friction-free in operation;
is suitable for executing a regulating distance under load;
is optimum in damping or in attenuation behavior.

In view of the foregoing advantages, the general utilization of load resolving wedges have not been successful. For example, in weighing technology this is due to certain difficulties such as the requirement of all-around guidance of the wedge and due to the necessity of a dust-tight encapsulation of the oil conducting parts. The lack of complete success has also been due to the requirement of making an extensive offering or availability of resolving wedges having different leads and dimensions available for different load ranges and also due to the difficulty of designing a hydrostatic wedge arrangement to form a compact self-contained machine element.

It is accordingly an object of the present invention to provide a structure which retains the advantages of a force resolving wedge and yet obtains an improved weighing device having a force transducer and a weighing cell and force measuring member which are formed into a compact load cell which can be manufactured by economical means and is capable of covering a wide load range using only a few types of standardizable and normal components or individual elements. It is also an object of the present arrangement to provide a structure which produces no external forces which must be compensated by support elements and which has a structure capable of utilizing a dust-tight encapsulation which is not complicated and can be employed for use in a great many branches of industry, particularly which is capable of measuring great forces with the highest precision.

A feature of the invention is to provide a weighing appliance of the type above referred to where the force transducer is designed as a hydrostatic spindle and nut unit having helical work surfaces which convert an axial or weight force into a torque effective at right angles relative to the direction of force or weight and employing a weighing cell connected to a force measuring member through a torque arm.

The structure embodying the principles of the invention fully utilizes or exploits the advantages of a force resolving wedge and on the other hand, overcomes difficulties existing in devices heretofore available. Such difficulties are avoided as in the necessity of compensating for external forces by a support element. Further, an extremely wide load range is covered without creating problems, and the device makes it capable of having a structural series of standard and normal modules. With this arrangement, at least one power of 10 is covered in the load range with the length of a torque arm which can be adjusted as desired. Further, the spindle and nut arrangement is suitable dust-tight encapsulation with uncomplicated structure. Further, because of its compact and self-contained structure, the unit is employable as an element in a great many branches of industry where large weights must be measured or where large forces must be measured with high precision.

It is a feature of the invention that a hydrostatic spindle and nut arrangement is utilized which is connected to a supply system for a hydrostatic parting liquid supplied under pressure. The unit employs helically inclined work surfaces which have a lead between 1:10,000 and 1:10, but preferably in the range of between 1:1,000 and 1:100. With the utilization of helical work surfaces with an extremely slight lead and hydrostatic liquid between the surfaces an essentially friction-free weighing device is accomplished which develops a high mechanical resolution when resolving the weight force and the apparatus is successful in weighing even the heaviest loads with high precision. Because work surfaces with such slight leads require processing precisions having surface qualities in the micron range, the problem of economical fabrication feasibility is increased. This is resolved in one form by manufacturing the work surfaces by coating metal surfaces of the spindle and nut unit with a pressure injection method. With this method, a molding is manufactured for a work surface with the identically equivalent cooperating work surface which enables economical shaping of the work surfaces of a synthetic material, and with the utilization of the pressure injection method, the surfaces can be produced with high precision.

In accordance with the present invention, the apparatus includes generally the following parts:

a stationary member including a lower part or base body with an upper helically shaped work surface and a concentric central bore for the acceptance of a centering shaft;

a nut freely resting against the base body having on its underside a helically extending work surface cooperating with the work surface of the base body and having an upper side having a helically shaped work surface and a concentric bore in the center receiving a centering shaft;

a centering shaft disposed in the bores with the base body and nut and guided in friction-free contact therewith by hydrostatic parting surfaces;

an upper part to the stationary member which is designed as a load pick-up and which on its underside has helically extending work surfaces coacting with the work surfaces of the nut with hydrostatic bearing means therebetween;

a torque arm radially disposed at the nut;

a stationary force measuring member connected to the torque arm;

a system of channels for delivering and removal of hydrostatic parting liquid to the centering shaft and to the helical work surfaces.

An arrangement of this embodiment resides in the identical configuration of the work surfaces of the base body and nut which improves the ability to manufacture the unit and reduces manufacturing costs. Further, due to the disposition of the centering shaft which is equipped with hydrostatic parting surfaces, an exact and reliable, and therefore contact-free and friction-free guidance of the spindle body and nut body is achieved. Further, the upper stationary member, as a result of its friction-free horizontal displaceability by means of hydrostatic parting surfaces, transmits an exact load pick-up even with a slight eccentric offset of a load.

As a result of the space-saving compact structure of the spindle and nut unit which externally preferably is in the shape of a cylindrical block, provides for more ease of sealing with an elastic gasket to prevent the escape of hydraulic fluid.

Further advantages are obtained in the error-free force resolution of the supported load even with a force introduction which may not be precisely centered. This is accomplished in that the work surfaces of the base and nut are subdivided into at least two, and preferably three, helically designed subsurfaces which are grouped around a common center similar to a three-leaf clover.

In another form of the invention, the weighing apparatus utilizes at least two hydrostatic spindle and nut units having torque arms which are interconnected to form a load chain which is connected to a force measuring member.

Other objects, advantages and features, as well as equivalent structures which are intended to be covered herein, will become more apparent with the teaching of the principles of the invention in connection with the disclosure of the preferred embodiments in the specification, claims and drawings in which:

DESCRIPTION OF THE DRAWINGS

FIG. 1 is a vertical sectional view taken through a hydrostatic spindle and nut unit with portions of the hydrostatic fluid supply shown schematically;

DESCRIPTION OF THE PREFERRED EMBODIMENTS

Figure 1A:
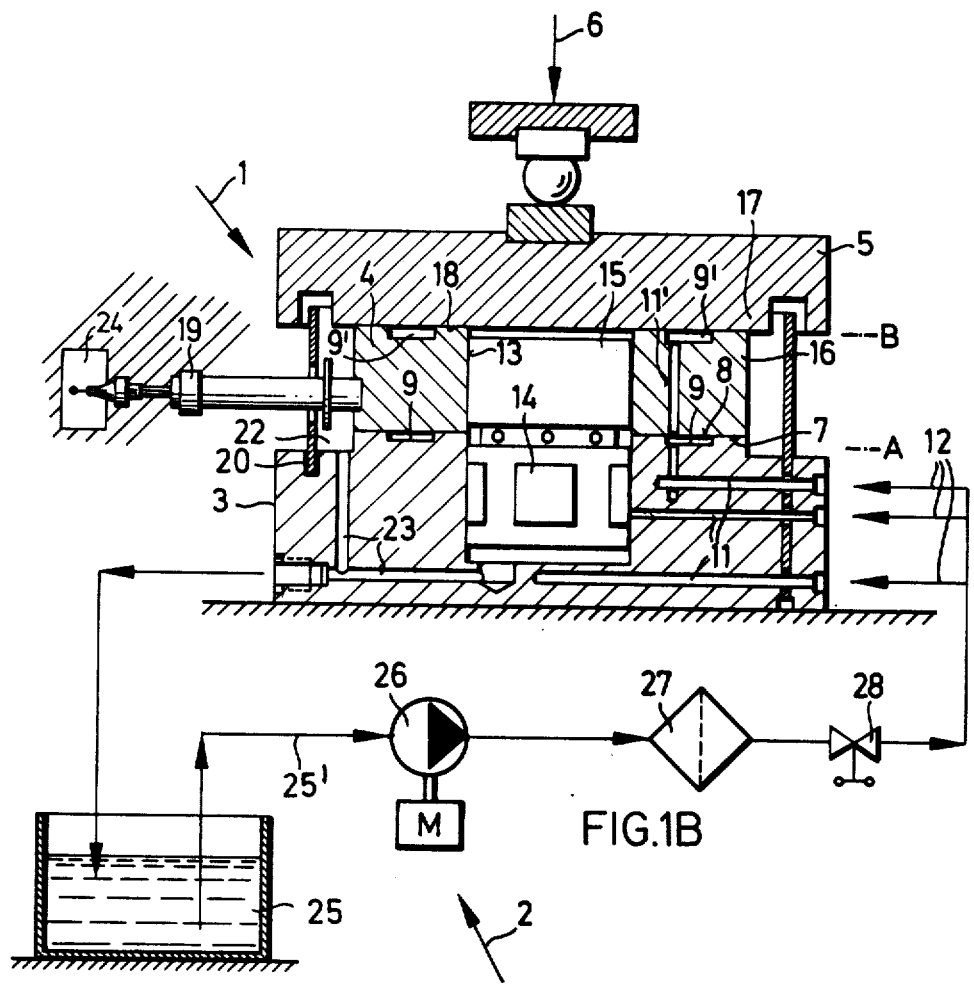
FIG. 1a is a vertical sectional view showing the sloping surfaces in exaggerated form.
Figure 1A:
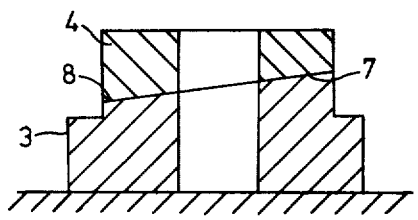

FIG. 1 illustrates a force transducer embodying the principles of the present invention used as a weighing appliance and including a hydrostatic spindle and nut unit 1 which is connected to a supply system 2 for a hydrostatic parting liquid supplied under pressure. The hydrostatic parting liquid is supplied to bearing pockets to provide a frictionless bearing contact between the adjacent parts.

The spindle and nut unit includes a stationary member or base body 3 with a relatively rotatable nut 4 freely resting on the base body 3, and an upper stationary load transmitting member 5 functioning as a load pick-up to accept the load in the form of a vertical force indicated by the arrowed line 6.

The base body 3 and the nut 4 have mutually facing surfaces 7 and 8 which are constructed as helically shaped work surfaces extending generally laterally or horizontally relative to the vertical axis of the nut and base, with the load 6 acting along the axis.

Between the helical disposed work surfaces are pockets or recesses 9 for receiving a hydrostatic lubricating liquid and the recesses are interconnected by means of channels 11 and 11' to the pressure lines 12 of the hydrostatic liquid supply system 2.

Figure 4:
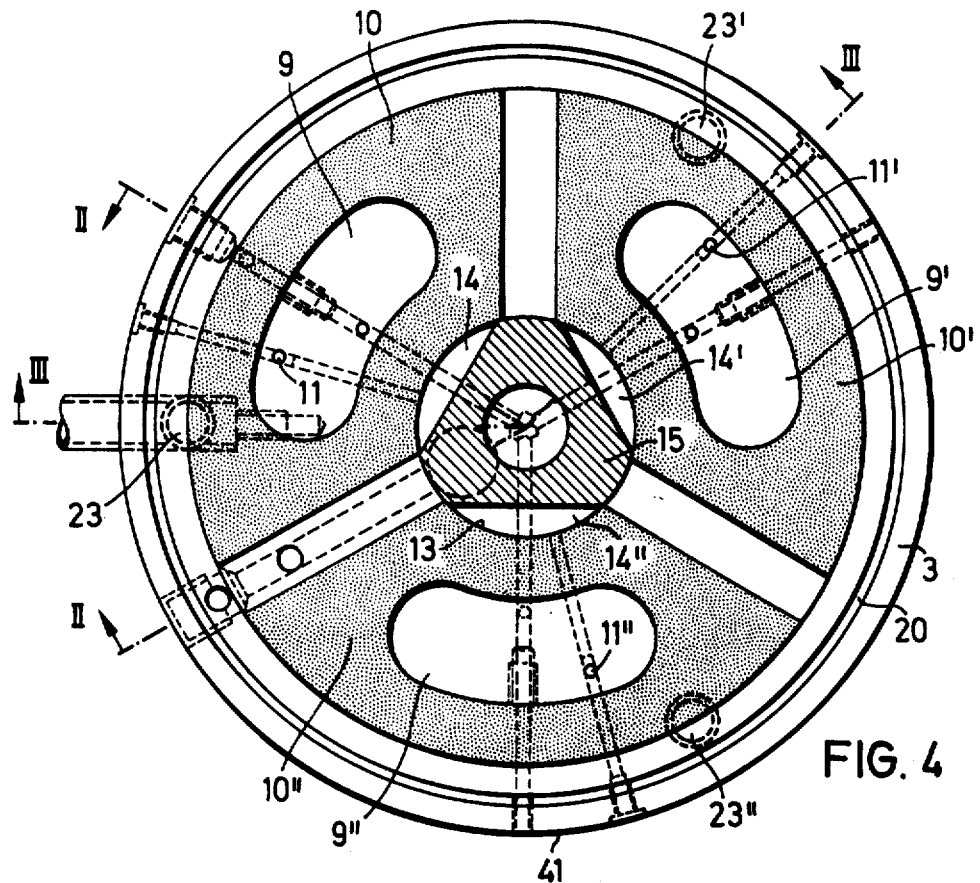
FIG. 4 is a horizontal sectional view taken generally along the line A of FIG. 1 and illustrating the helical work surfaces.

The work surfaces 10, 10' and 10" are illustrated in FIG. 4 and are constructed with a relatively slight helical lead which, for purposes of understanding, can be compared to a three blade propelling screw of a watercraft. The design of the hydrostatic pockets 9, 9' and 9" is also illustrated in FIG. 4 with the pockets essentially centered within the helical areas or work surfaces 10, 10' and 10". Hydrostatic liquid is pumped into these pockets maintained under pressure with the escaping liquid being caught and returned to the liquid supply sump 25, FIG. 1.

Referring to FIG. 1, the base body 3 and nut 4 have a centrally located concentric vertical bore 13 in which is positioned a centering shaft 15 positioned therein in a friction-free manner. While the centering shaft may be friction-free with respect to the nut or the base body, or both, it is illustrated as maintained friction-free relative to the base body by pockets 14 arranged circumferentially around the shaft 15. The shaft is so arranged that hydrostatic liquid under pressure will be continually supplied to the recesses 14 to maintain it in friction-free relationship with the base body in order to hold the nut centered over the base body and maintain the facing helical work surfaces of the nut and base body in axial alignment.

Between the nut 4 and the force transmitting member 5 is a parting surface 18 having pockets 9, 9' and 9". These pockets are supplied with hydrostatic fluid through the passage 11'. Thus, the force transmitting member 5 on the upper surface of the nut 4 floats on a liquid layer of hydrostatic parting fluid so that the nut can rotate relative to the base body 3 due to the influence of the vertical load 6 acting on the helical work surfaces. The pockets 9, 9' and 9" also permit small excursions of the load in a horizontal direction without inducing friction forces which would result in an error reading as to rotation or movement of the nut.

Connected to the nut 4 is a torque arm 19 which transmits the torque to a force measuring member, not shown in detail in FIG. 1, but generally located at 24.

As illustrated in FIG. 1, a cylindrical seal 21, preferably of elastic material, is disposed in an annular groove 20 on the upper face of the base body 3. The seal 21 protects the oil conducting parts of the spindle and nut unit against the penetration of dirt. The seal is constructed to rest in the groove 20 with the upper edge forming a weir for the escaping hydrostatic liquid which then collects in an annular space 22 inside of the seal and flows through channels 23 into the sump 25.

The sump provides hydrostatic liquid which is withdrawn through an intake line 25' by the pressure pump 26 which delivers the fluid through a filter 27 and past an adjustable throttling valve 28 into lines 12 where it flows through the channels 11 and 11' into the pockets 9, 9' and 9" between the work surfaces 10, 10' and 10" and builds up liquid parting layers. The parting surfaces 14 of the centering shaft 15 are also supplied with hydrostatic parting liquid to one of the channels 11. The pressure at which the hydrostatic liquid is delivered may be determined in accordance with the loads to be carried, but preferably the parting liquid is delivered under a pressure in the range of 35 through 50 bar.

Figure 2:
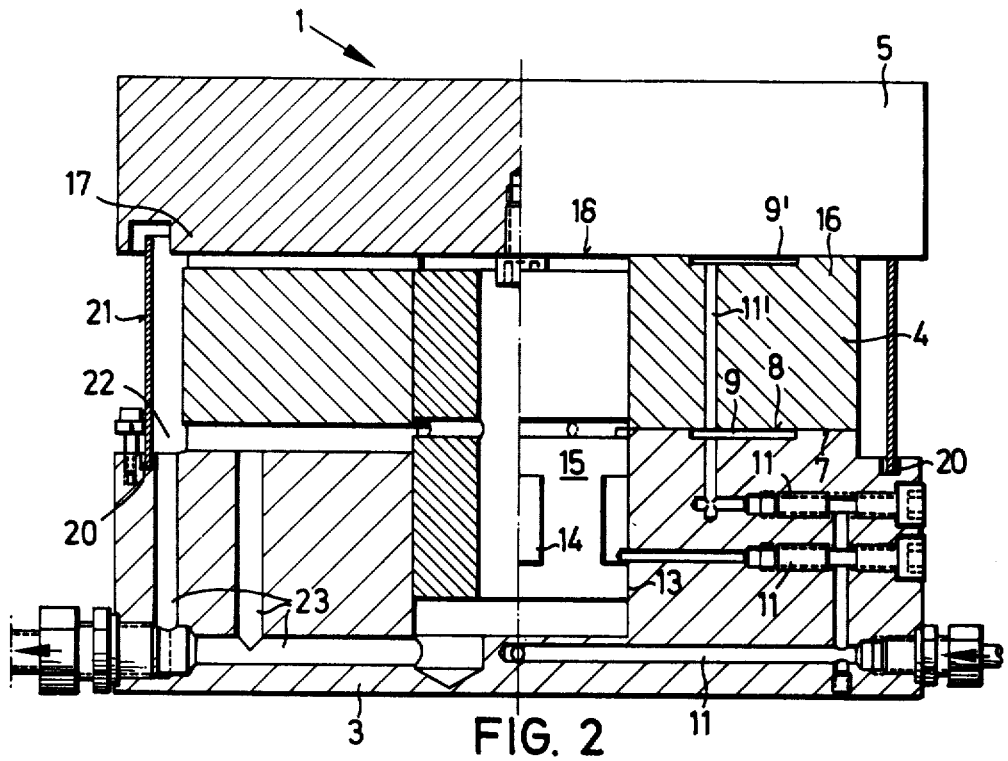
FIG. 2 is a fragmentary sectional view with the portions in section taken generally along line II—II of FIG. 4.
Figure 3:
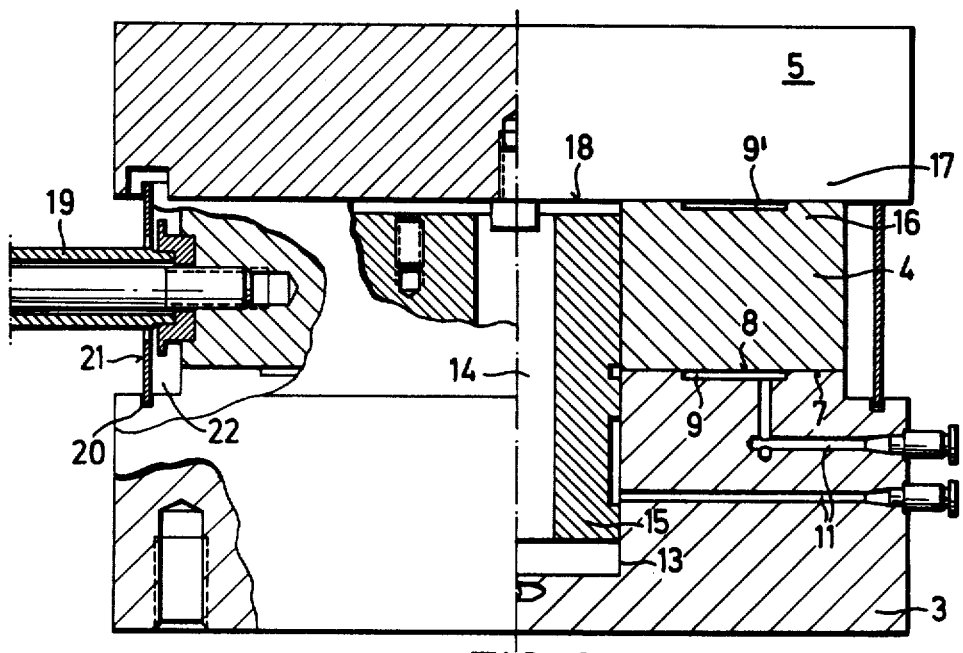
FIG. 3 is a partial sectional view with the portions in section taken generally along line III—III of FIG. 4.

FIGS. 2 and 3 show sections of the spindle and nut unit in enlarged scale, and the parts are illustrated referenced with the same reference numerals as the structure shown in FIG. 1.

As above referred to, in FIG. 4, is shown a plan view in section of the base body 3, and the base body has a cylindrical outer shape 41. FIG. 4 also shows the annular groove 20, the work surfaces 10, 10' and 10", the passages 11, 11' and 11" for the feed of the liquid under pressure, and the passages 23, 23' and 23" for the return of the liquid. FIG. 4 also shows the concentric bore 13 with the centering shaft 15 located therein with the pockets 14, 14' and 14". FIG. 4 also shows the separation of the work surfaces into three subsurfaces 10, 10' and 10" which are generally in the shape of a three-leaf clover, and each of which is helical coacting with mating helical surfaces on the nut. While the subsurfaces are preferably two or three in number, other numbers of surfaces may be employed.

Figure 5:
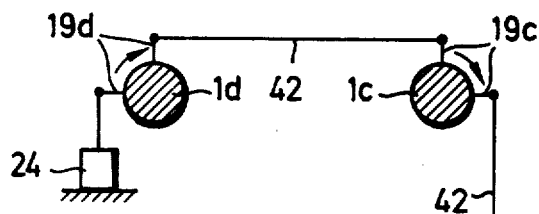
FIG. 5 is a somewhat schematic showing of four hydrostatic spindle and nut units wherein the torque arms are interconnected to form a load chain with the arrangement shown in plan view.

FIG. 5 illustrates the apparatus wherein four essentially identical spindle and nut units are provided 1a, 1b, 1c and 1d. Each of the units has a torque arm 19a, 19b, 19c and 19d which are connected to each other such as mechanically by mechanical connectors 42, and these are connected to a force measuring member 24. The arrangement of FIG. 5 shows the advantageous uncomplicated interconnection of the plurality of spindle and nut units, being connected into a load chain by the torque arms 19a through 19d and the connectors 42 can be, for example, steel wires or cables. It is also possible to provide individual force measuring members for each of the torque arms and interconnect the force measuring members so as to be electrically additive and read a total figure.

Figure 6:
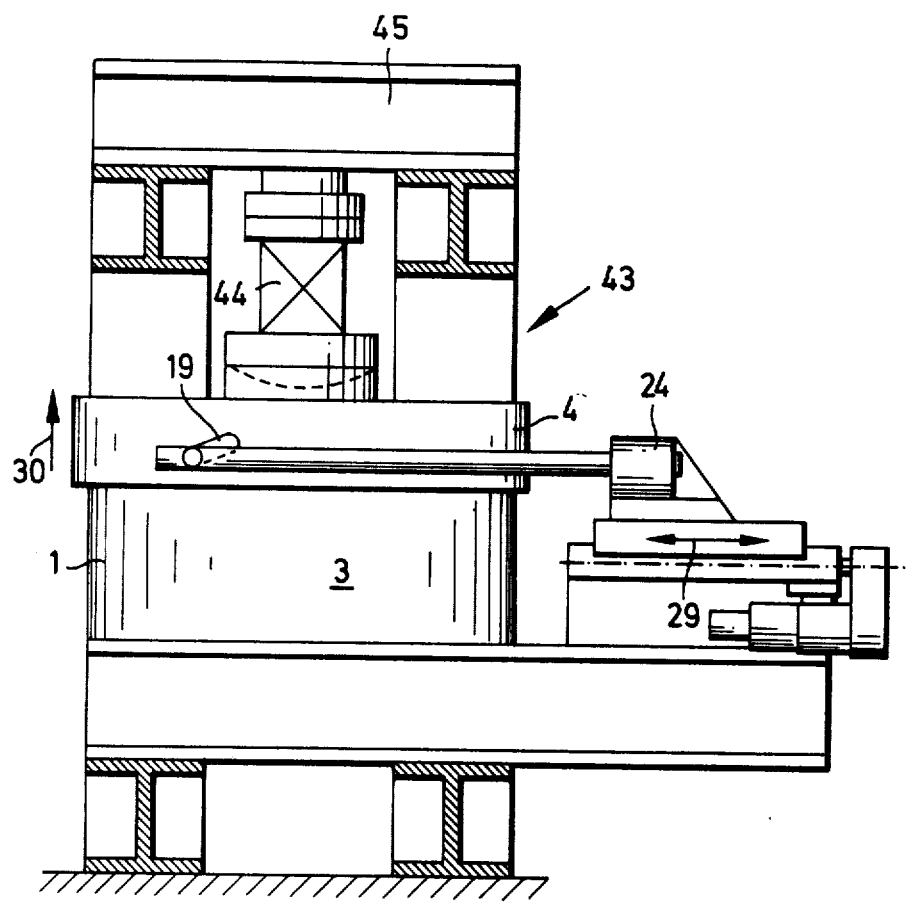
FIG. 6 is an elevational view, with parts in section, illustrating the apparatus used as a measuring element in a material inspection and load machine.

FIG. 6 illustrates an arrangement of the structure utilized in a material test and load machine 43 wherein a test specimen 44 is chucked in between the hydrostatic spindle and nut unit 1 and a yoke 45. An angular adjustment drive 29 engages the torque arm 19 and rotates the nut 4 relative to the base body 3 and thereby generates a work stroke in the axial direction of the arrow 30. As a result, the test specimen 44 between the yoke 45 and the upper part of the nut 4 is compressively loaded and the force measuring member 24 measures the absolute height of the attacking load. In this instance, the measuring element which is the combined force measuring member with the weighing cell measures a distance displacement which is converted into terms of axial displacement of the nut. In principle, the arrangement utilizes the features of the structure which function to indicate the displacement rotationally of the nut in terms of axial force applied by the load or weight applied at the arrowed line 6 in FIG. 1.

Figure 7:
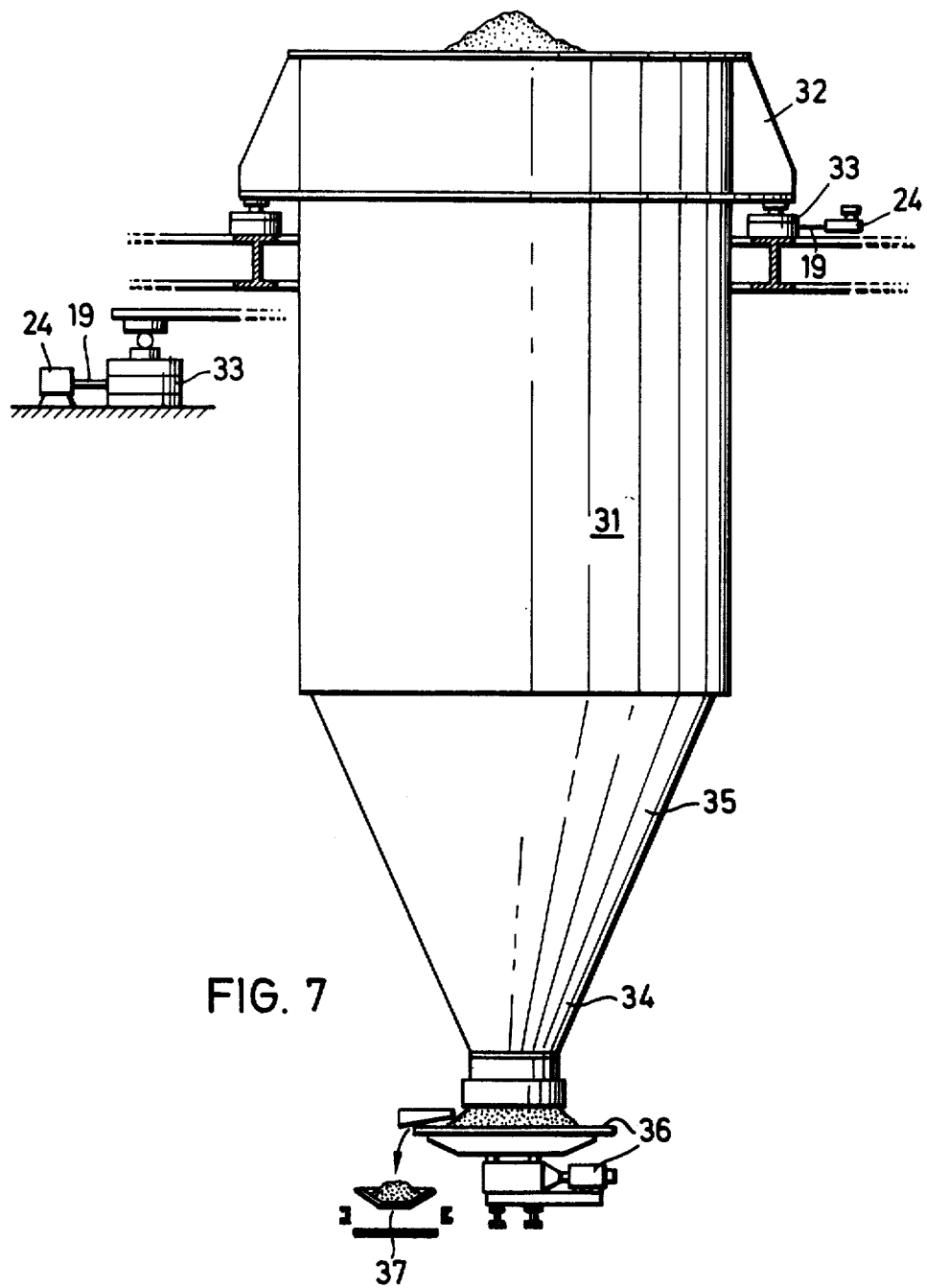
FIG. 7 is an elevational view illustrating a plurality of weighing apparatus in a bulk hopper arrangement.
Figure 8:
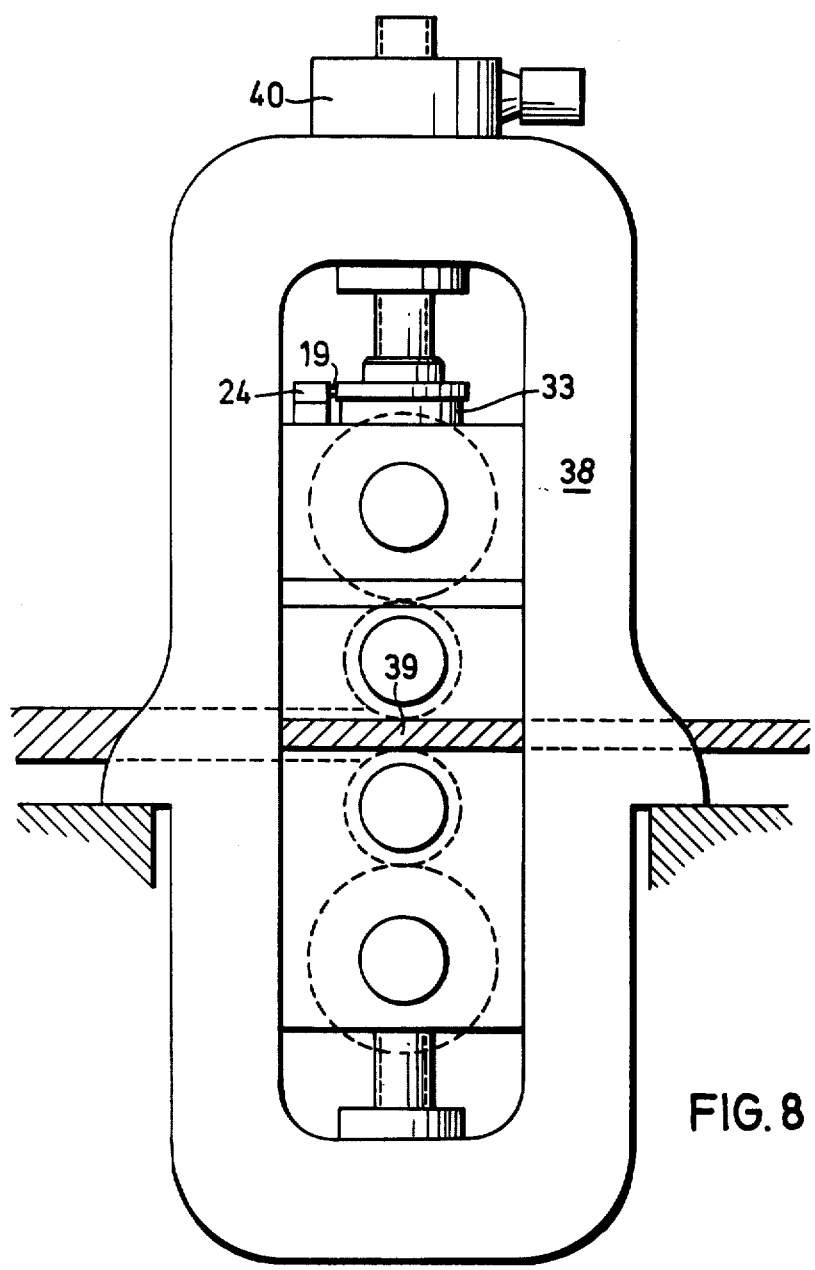
FIG. 8 is an elevational view showing an apparatus embodying the principles of the present invention and utilized as a measuring and fine adjustment means in a thin sheet rolling frame.

FIGS. 7 and 8 illustrate further application of the structure of the invention with FIG. 7 showing a hopper 31 such as having a capacity between 1,000 and 2,000 tons for goods such as for the stone and clay industry. The hopper is supported on brackets 32 and is suspended with weighing cells 33 constructed in accordance with the invention. A rotary plate arrangement 36 is positioned at the bottom of the hopper and removes material and ejects it onto a conveyor belt 37 and is located at the lower part 34 of the conical point 35 for volumetrically meter discharge. In the manner of the arrangement shown in FIG. 5, the weighing cells 33 are interconnected with their torque arms 19 to form a load chain and are connected to a force measuring member 24. The weighing cells 33 together with the force measuring members 24 may be termed the measuring elements. With this arrangement, a weight differential when filling or emptying the hopper 31 can be monitored continuously so that operations which relate to the quantity of material filled or removed from the hopper can be instantaneously and continually read or can be automatically controlled by the weighing structures.

FIG. 8 shows the application of the weighing cell 33 utilized to control a regulating distance with rotation of the nut. In the structure of FIG. 8, the weighing cell in addition to functioning as a scale, also serves at the same time as a setting means for control under full load, similar to the application in FIG. 6. In the arrangement of FIG. 8, a roller frame 38 is shown for manufacturing a thin sheet wherein the roll pressure as well as fine and superfine adjustment of the roller gap 39 can be controlled by means of the structure 39. A rough adjustment control 40 is located at the head of the machine for large regulating distances, but the weighing cell 33 controls a fine adjustment at its location and operates continuously under load.

Thus, it will be seen that we have provided an improved force measuring device which meets the objectives and advantages above set forth and is capable of a wide range of applications utilizing the features and advantages of the invention.

I claim as my invention:

1. A weighing apparatus capable of measuring with high precision a very large load such as imposed by a large weight comprising in combination:
   a force transducer having a stationary base member;
   a rotatable nut unit engaging said stationary member;
   said nut and stationary base member having helical work surfaces therebetween facing the axial direction of application of force due to an applied load forcing the stationary member and nut toward each other and converting the axial force into a torque effective at right angles to the axial direction of said force; and
   a force measuring member connected to the force transducer through a torque arm measuring the torque due to said force.

2. A weighing apparatus capable of measuring with high precision a very large load such as imposed by a large weight constructed in accordance with claim 1:
   including a frictionless bearing means between said helical work surfaces including means supplying a hydrostatic parting liquid under pressure.

3. A weighing apparatus capable of measuring with high precision a very large load such as imposed by a large weight constructed in accordance with claim 1:
   wherein said work surfaces have a lead in the range of 1:10,000 to 1:10.

4. A weighing apparatus capable of measuring with high precision a very large load such as imposed by a large weight constructed in accordance with claim 1:
   wherein said work surfaces have a lead in the range of between 1:1,000 and 1:100.

5. A weighing apparatus capable of measuring with high precision a very large load such as imposed by a large weight constructed in accordance with claim 1:
   wherein the nut unit and stationary member are formed of metal and said work surfaces are formed of a synthetic material applied by a pressure injection method.

6. A weighing apparatus capable of measuring with high precision a very large load such as imposed by a large weight constructed in accordance with claim 1:
   wherein said stationary member includes a force transmitting member above said nut.

7. A weighing apparatus capable of measuring with high precision a very large load such as imposed by a large weight constructed in accordance with claim 6:
   including a centering shaft extending axially through an opening in said nut and an opening in the stationary base member maintaining the nut and stationary member in alignment.

8. A weighing apparatus capable of measuring with high precision a very large load such as imposed by a large weight constructed in accordance with claim 7:
   including hydrostatic bearing means between said shaft and one of said nut and said base member.

9. A weighing apparatus capable of measuring with high precision a very large load such as imposed by a large weight comprising in combination:
   a stationary member having an upper part and a lower base member part;
   a nut unit between said stationary member parts;
   helical work surfaces extending generally laterally of the axis of said nut and stationary member permitting relative rotation of said nut converting an axial force applied to the stationary member into a torque effective at right angles to the axial direction of said force;
   a force measuring member connected to the nut; and
   a frictionless bearing means between said helical work surfaces for free relative rotational movement of said nut.

10. A weighing apparatus capable of measuring with high precision a very large load such as imposed by a large weight constructed in accordance with claim 9:
    wherein said frictionless bearing means includes means for delivering a hydrostatic parting liquid between said work surfaces and an elastic gasket surrounds said nut for the containment of hydrostatic liquid.

11. A weighing apparatus capable of measuring with high precision a very large load such as imposed by a large weight constructed in accordance with claim 1:
    wherein said helical work surfaces are divided into at least two circumferentially separated areas.

12. A weighing apparatus capable of measuring the high precision of a very large load such as imposed by a large weight constructed in accordance with claim 1:
    including a second force transducer of the same construction with structure interconnecting said nuts and connecting to said force measuring member so that said transducers operate in unison.

13. A weighing apparatus capable of measuring with high precision a very large load such as imposed by a large weight comprising in combination:
    a vertical unit adapted for receiving a vertical weight and including stationary members having upper and lower parts and also including a rotatable nut sandwiched between said stationary member parts;
    a plurality of circumferentially separated helically shaped work surfaces between the nut and said stationary member parts having pressurized hydrostatic bearing recesses between the work surfaces;
    a pressure pump connected to deliver hydrostatic liquid to said recesses;
    a centering shaft extending through an opening in the center of said nut and through an opening in the center of the lower part of said stationary member maintaining the nut in alignment with the stationary member;
    hydrostatic liquid pockets positioned between the shaft and the lower part of the stationary member and connected to receive hydrostatic liquid from said pump;
    a torque arm radially disposed at the nut; and
    a stationary force measuring member connected to the torque arm.

14. A weighing apparatus capable of measuring with high precision a very large load such as imposed by a large weight constructed in accordance with claim 13:
    wherein said force measuring member is in the form of a drive for generating relative rotation of the nut relative to said stationary member parts.

* * * * *